H. B. NICHOLS.
UNIVERSAL GRINDING MACHINE.
APPLICATION FILED SEPT. 5, 1908.

944,902.

Patented Dec. 28, 1909.
8 SHEETS—SHEET 1.

Fig. 1.

Inventor
Henry B. Nichols,

H. B. NICHOLS.
UNIVERSAL GRINDING MACHINE.
APPLICATION FILED SEPT. 5, 1908.

944,902.

Patented Dec. 28, 1909.

Witnesses:
D. W. Edelin
H. H. Löwenstein

Inventor
Henry B. Nichols
by Edward S. Clement
Atty.

H. B. NICHOLS.
UNIVERSAL GRINDING MACHINE.
APPLICATION FILED SEPT. 5, 1908.

944,902.

Patented Dec. 28, 1909.
8 SHEETS—SHEET 8.

Witnesses
H. F. Lowenstein
James H. Marr

Inventor
Henry B. Nichols
By Edward E. Clement
Attorney

UNITED STATES PATENT OFFICE.

HENRY B. NICHOLS, OF PHILADELPHIA, PENNSYLVANIA.

UNIVERSAL GRINDING-MACHINE.

944,902.  Specification of Letters Patent.  Patented Dec. 28, 1909.

Application filed September 5, 1908. Serial No. 451,875.

*To all whom it may concern:*

Be it known that I, HENRY B. NICHOLS, a citizen of the United States, residing at Philadelphia, in the county of Philadelphia and State of Pennsylvania, have invented certain new and useful Improvements in Universal Grinding-Machines, of which the following is a specification, reference being had therein to the accompanying drawing.

My invention relates to metal working machinery and especially to grinding machines.

It has for its object the provision of improved means for accurately grinding plane surfaces with particular reference to the surfaces of railway rails.

The standard type of railway rails now in common use has head and foot flanges with a connecting web, constituting in effect a girder. These rails are rolled and the exact form and dimensions of their several parts are subject to many variations. For example, a cross section of the ordinary steam railway rail shows a plain T inverted, with a somewhat thickened head. The commonest form of traction rail for urban lines shows either a grooved head or a lateral flange extending out just below the head to form a channel with inclined faces. In either case the actual rolling surface for the wheel treads is upon the top of the rail head, so it becomes a matter of considerable importance to have these heads truly alined upon their upper surfaces. This can only be done, however, by absolute uniformity at the rail ends, and accuracy of fitting in the joints.

Disregarding welded joints which are no longer considered within the scope of the best practice, and also disregarding various impracticable schemes which have been proposed from time to time for joining rail ends by means of lugs or the like formed on the rails themselves, all commercial types of rail joints employ some form of fish plate or its equivalent. The fish plate is adjusted upon the rail with inclined flanges along its upper and lower edges resting against corresponding inclined surfaces on the lower side of the rail head and the upper side of the foot flange. The alinement of two conjoined rail ends is therefore based upon and determined by the accuracy of surfacing of these faces. The angles of the surfaces also constitute a factor, because in drawing up the fish plates, a slight variation in angle would raise or lower the rail a perceptible amount, to the detriment of the joint. The thickness of the rail foot is a secondary matter, but it will be observed from what has already been said that the thickness, that is to say the depth, of the rail head, must be absolute and invariable in order to secure results. Moreover, the distance between the opposed and adjacent surfaces of the head and foot must be constant, as well as their relative angles, for reasons already stated.

It will be noted that in any machine intended for surfacing the head and foot flanges, several important requirements must be met. In the first place longitudinal feed must be provided between the work and the tool, and some means of gaging from the rolling surface on the head of the rail, during the feed. In the second place, since continuous operation is necessary for the attainment of efficiency, means must be provided to compensate for wear of the cutting or grinding tool. In the third place, since there are angles to be considered and lateral as well as longitudinal feed is involved, there must be opposite angular as well as parallel adjustments, and as a corollary to this, the adjustments must be adapted to the moving parts or tools, since the main feed is linear.

In meeting all the foregoing requirements, I have not only attained the object of my invention, but have produced what may fairly be called a universal grinding machine, useful for many other purposes than grinding rails, and I therefore present it herein as such, intending that the descriptive matter and illustrations furnished in the present case shall be used for purposes of definition and not of limitation, and that the claims appended hereto shall be construed with a scope commensurate to the breadth of my attainment. This being understood, I shall hereinafter for convenience refer principally to rail grinding.

Briefly stated, this embodiment of my invention comprises the following principal features: (1) a bed or work support with a superposed frame carrying a pair of oppositely disposed grinding or cutting tools, each on its own spindle, and mechanism to produce relative feed between the work and the tools; (2) means for calipering the wheels instead of the work during operation; (3) mechanism for changing the angle of one or more of the wheels, and for adjusting the same laterally in proper relation to the work as determined by the automatic calipers; (4) a special grinding wheel having graphite inserts for calipering purposes; and (5) a method of producing such a wheel.

The rail to be ground is supported on a bed plate which may be similar to and have a somewhat similar feed to that of the ordinary planer. Supported above this bed is a frame carrying a pair of inclined transverse spindles with their inner ends contiguous to each other and carrying the grinding wheels. These two spindles are driven from above by means of intermediate pulleys and belts, and are journaled in bracket bearings having a rocking adjustment ordinarily set in an intermediate position so as to halve the twist of the belts when moving the wheels through a full angle in either direction. The grinding wheels have annular inserts of a graphite composition in their faces, the same being worn away uniformly with the adjacent surfaces of the wheels as the grinding progresses. Upon these graphite rings rest hardened steel friction rollers carried on the ends of automatic calipering levers pivoted on the frame, whose opposite ends control electrical contacts in a pair of feed circuits which by means of magnetically actuated ratchets and pawls, can move the wheels along the lines of their respective axes, the usual adjustment being of course an advance by reason of the continuous wearing away of the wheel surface.

My invention is illustrated as to one embodiment in the accompanying drawings, which show a universal grinding machine, and in which.

It has already been stated that the principles involved in this invention are capable of embodiment in divers forms, and such embodiments are applicable to divers purposes. I believe the idea of automatic calipering so as to regulate the cut in a machine is original with me, and while I have heretofore described and claimed the same as applied to the surface of the work, I present herein for the first time automatic calipering means applied to the tool. In the present state of the art, which in this respect is passing through a transition period, grinding processes are being substituted for so-called cutting, or steel tool processes in many cases. It has come to be recognized that a surface can be ground for a finish with great accuracy, and the rough cuts taken off as well, and in fact that the grinding wheel is neither more nor less than a cutting tool which under normal conditions of speed and pressure makes a great number of small cuts and produces correspondingly small chips.

In all precision work where a grinding cutter is employed, compensation must be provided for the wear on the grinding body. This is the prime source of inaccuracy in grinding processes, and to correct it, the ordinary manual adjustment is both clumsy and inefficient. To produce the best results, the cut must be uniformly and continuously regulated, and the means for doing this are applicable to many other forms of metal working machine and cutting tools than those which I shall now describe.

This grinding machine is built in general somewhat after the fashion of the ordinary planer, and it may either have a reciprocating bed, or a traveling tool support or bridge, preferably the former. The frame and other general features of the machine are omitted from the drawings for simplicity, and because they form no direct part of the present invention. The bed of the machine is crossed by a superposed bridge carrying a frame for the grinding wheels and their associated parts; and between the bed and this frame a reciprocating longitudinal feed is provided, which may be of the ordinary screw and traveler type or such other as may be found desirable. In the specific form illustrated, the bed plate carries a rail support, the former being marked 1 and the latter 2. The plate and support reciprocate beneath the superposed frame 3, upon which are mounted a pair of grinding wheels 4 and 5. The rail 6 lies upon the support 2, which is shaped so as to fit into the angle of the tram and web, the latter being horizontal. This projects the head and foot flanges vertically so that their inner faces 7 and 8 may be engaged by the wheels 4 and 5. It has already been explained that the relation of these faces 7 and 8 must be constant as regards both distance and angle, and also that the joint relation of these two faces and the surface 9 on the head 10 must be maintained constant, or, in other words, that the thickness of the head must not vary. To secure these results, and in order to guard against any variation due to the wearing away of the wheels, the latter are made adjustable to and from each other, also in an arc having a large vertical component; and all these adjustments are referred to certain fixed stops or guides which determine a fixed plane in which the surface 9 must rest during grinding. These stops or guides are constructed as brackets 11 and 12, held in T-slots 13 and 14 formed in lugs on the underside of the frame 3. Each bracket is bifurcated as shown at 15, and carries a hardened steel roll 16 journaled on a pin 17. A further adjustment is provided which is never changed during the operation of the machine and is therefore not properly classed with the others. This is the adjustment of the rolls 16 toward and away from the rail-support 2. It is of use when setting up the machine for different shapes or sizes of rails, and for taking up wear on the rolls and pins. It is accomplished through the agency of shouldered feed screws 18 and 19, whose shoulders 20 lie upon opposite sides of projecting abutments on the frame, and whose threaded stems engage the brackets 11 and 12 to move them in the T-slots. For operative purposes these brackets with their rolls may be referred to as the fixed guides, since they, with the support 2 determine the correct position of each rail as it is run through the machine.

It will be observed that the grinding is accomplished by the faces of the wheels, which work against the surfaces 7 and 8 in opposite directions. Edge grinding on the same wheels, and also grinding on the inner faces may be resorted to, but in grinding rails as shown the wear will all be on the outer faces, i. e., those which lie away from each other. To compensate for this wear feed screws 21 and 22 are provided, carried in overhanging brackets 23 and 24 and acting upon the wheels through travelers 25 and 26; and in order to permit of the automatic control of these feed screws in response to wear on the wheel, a peculiar construction of the latter is resorted to which I will now describe.

Figure 1:
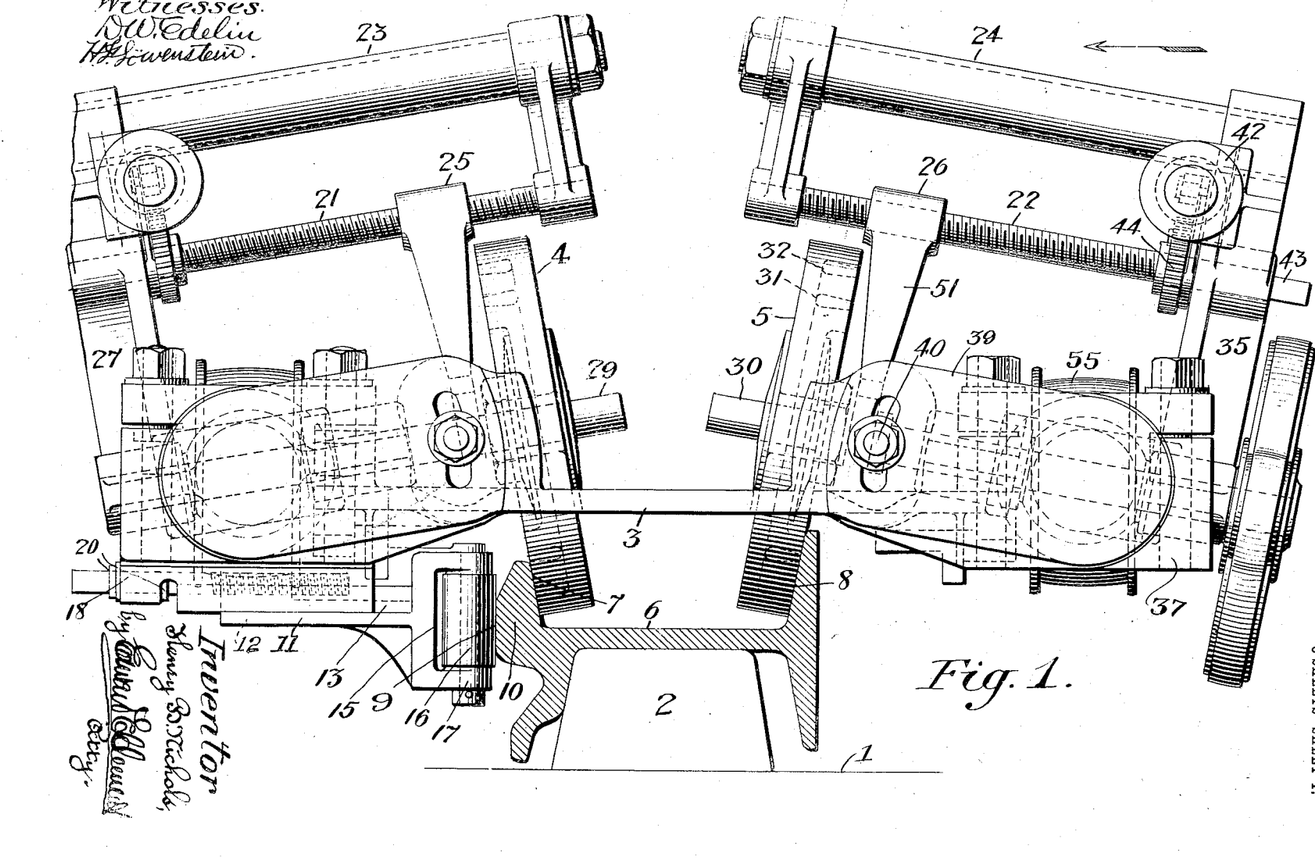
Figure 1 is an end view partly in section.
Figure 5:
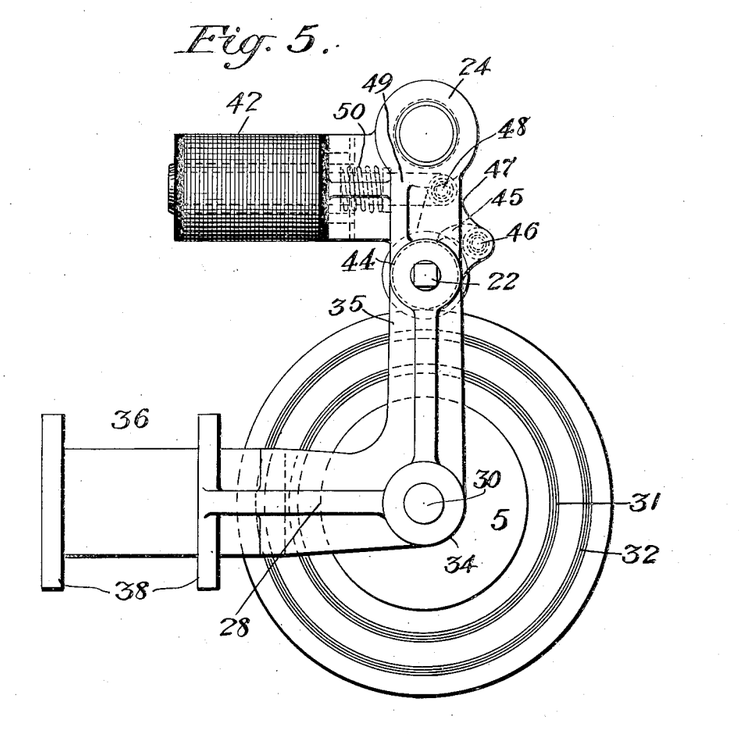
Fig. 5 is a side view of wheel and bracket detached from the machine.
Figure 6:
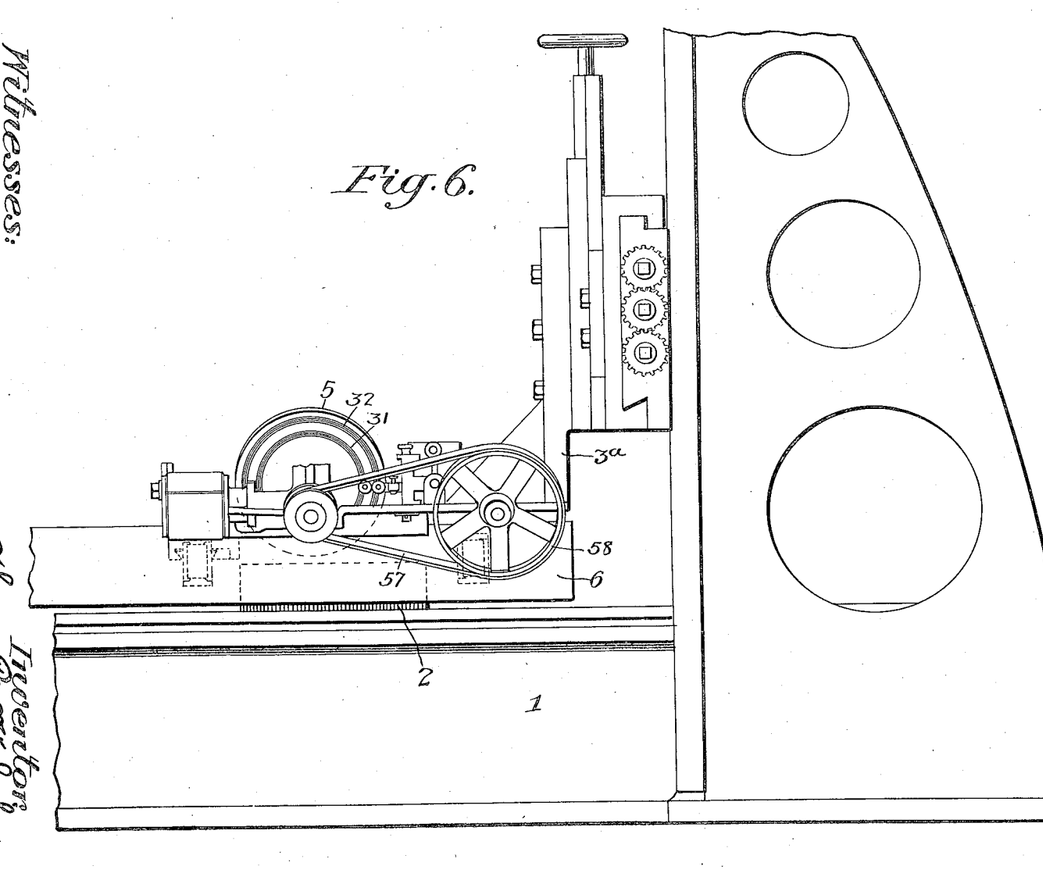
Fig. 6 is a side view of the complete machine showing pedestal and bridge, with parts mounted thereon.
Figure 7:
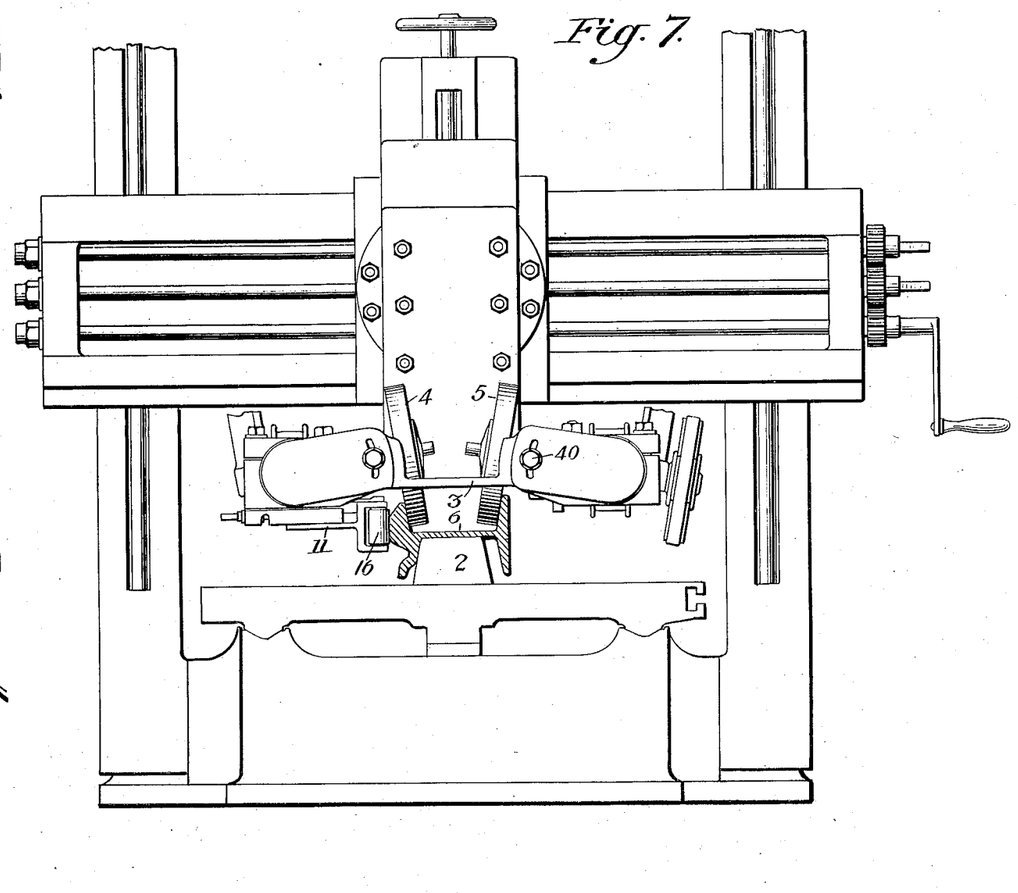
Fig. 7 is an end elevation of the same.

Fig. 1 shows the wheels edge on, the dotted lines indicating their sectional formation, while Fig. 5 shows one wheel bracket or frame 28 removed, and the wheel with its face exposed. The body of the wheel is formed of abrasive material such as carborundum or the like, properly shaped and with suitable fittings to secure it to the spindle 29 or 30. As it would be impracticable to apply the automatic calipers directly to the surface of this abrasive material, I provide inserts in the shape of annular bodies of anti-friction or lubricant material at 31 and 32. The best material for this purpose which I have found up to the present time is graphite molded into channels or grooves in the wheels. One process of molding consists in mixing the graphite with water to form a thick paste, and then pressing this into the grooves so as to expel as much of the water as possible, and evaporating the rest. This process, however, is not entirely reliable in its results because of the shrinkage of the paste in drying, unless constant and very heavy pressure is employed, such as that obtainable by hydraulic means, with the attendant danger of fracturing the wheel. I prefer, therefore, to employ a binder which under ordinary conditions of temperature and pressure is a solid, and which can remain permanently incorporated with the graphite. Such a binder I have found in sulfur, which does not seem to affect the operation of the wheel or impair the efficiency of the graphite for my purpose. This is first melted, and the powdered graphite is stirred or ground into it in the proportion of two parts by weight of graphite to one of sulfur. The wheel body is then heated to a uniform temperature of about 212° Fahrenheit, the paste is poured or pressed into the grooves, and the whole allowed to cool. The two rings 31 and 32 thus formed present a smooth anti-friction surface for the calipers, sufficiently hard for accurate dimensioning, while I have found that the insert will wear away uniformly with the surface of the abrasive material and will not deter the grinding by its lubricant qualities.

The two wheels 4 and 5 are uniform, although of course reversed as to their mountings, and a description of one will therefore suffice for both.

The bracket 28 is U-shaped, with spindle bearings in the extremities 33 and 34 of its arms or bifurcations, and a stem or trunnion 36 fitted to bearings 37 formed on the frame 3, and shouldered at 38 to prevent end play. Each bracket may thus be turned in the bearings 37, in order to change the angle of the wheel spindle 29 or 30 and therefore of the face of the wheel, relatively to the frame 3. This angular motion is limited and the adjustment held by means of a slotted arm 39 on the outer end of the trunnion which is bolted at 40 to a lug 41 on the frame 3. The outer arm of the bracket 28 has an upstanding extension 35 cast upon it, both this and the U-arms being flanged to secure rigidity, and the upper end of the arm 35 carrying the overhang 24 and feed screw 22, together with a solenoid 42 and ratchet mechanism actuated thereby for turning the feed screw. For the purpose of setting up the machine and preliminary adjustment the screw 22 has a squared head 43 outside of the arm 35.

The solenoid and ratchet mechanism are best shown in Fig. 5. The ratchet wheel 44 is fixed upon the feed screw, and coöperating with it is a pawl 45 pivoted at 46 on a rocker plate which turns on the stem of the screw, so the device is self-centering. The plate 47 is pivotally connected at 48 to the plunger 49 of the solenoid 42 (for which any desired type of electromagnet can be substituted) and the pawl is kept normally retracted by means of a spring 50. When the solenoid is energized its core or plunger is drawn in and the plate 47 is turned to the left in Fig. 5, causing the pawl to turn the ratchet and with it the feed screw 22.

The traveler or nut 26 carries an arm 51 which extends down and engages a collar fixed on the grinding head or the spindle, preferably the former. If the former, then the bushing of the head or wheel is splined on the spindle, and if the latter, the spindle must have end play in its bearings. As the screw 22 turns, the nut 26 and arm 51 are shifted, the latter carrying with it the grinding head, which moves in the direction of its axis, or on lines normal to the surface 7 or 8, thus maintaining the angle of the cut constant, while compensating for wear. The adjustment thus described could of course be brought about manually, but one of my principal objects is to make this automatic, and dependent upon as well as proportionate to the actual wear on the surface of the wheel. This object is attained by the use of the automatic calipers, which will now be described. The two spindles 29 and 30 are driven by belts 52 and 53 taking over pulleys 54 and 55 secured upon the spindles intermediate of the U-arms of the respective brackets 27 and 28. For the sake of uniformity in grinding, both belts preferably derive their power from the same countershaft, which is not shown but which may be either above or to the rear of the machine. One of the spindles, 30, carries a pulley 56 outside of its bearing, from which a belt 57 passes to the pulley 58 of the calipering mechanism. The latter is mounted on a rearward extension 3ª of the frame 3, and comprises the caliper levers 63 and 64 periodically actuated by a double reciprocating slide bar 65, 66, having an intermediate cam frame 67 and driven through a worm wheel from the spindle 68 and pulley 58. It should be noted that the driving pulleys of the spindles 29 and 30 are preferably connected thereto with a universal motion, so that their axes will remain parallel to the countershaft for all angular adjustments of the spindles, their centers at the same time remaining fixed, each in the axis prolonged of its trunnion 36, so there is no variation in the tension of the belts. A similar effect may be produced by giving these pulleys approximately spherical surfaces, or curving them on the centers. In order to avoid excessive twisting of the belt 57, the driving spindle 68 of the calipering device is permanently set at an angle so that its axis will be parallel to the axis of the spindle 30, from which it is driven, when the latter spindle is in its normal or intermediate position, equidistant from both extremities of its angular path of travel. By this means the planes of the pulleys 56 and 58 diverge from each other by only one-half the total angle of adjustment of the spindle 30, through its entire range.

Figure 2:
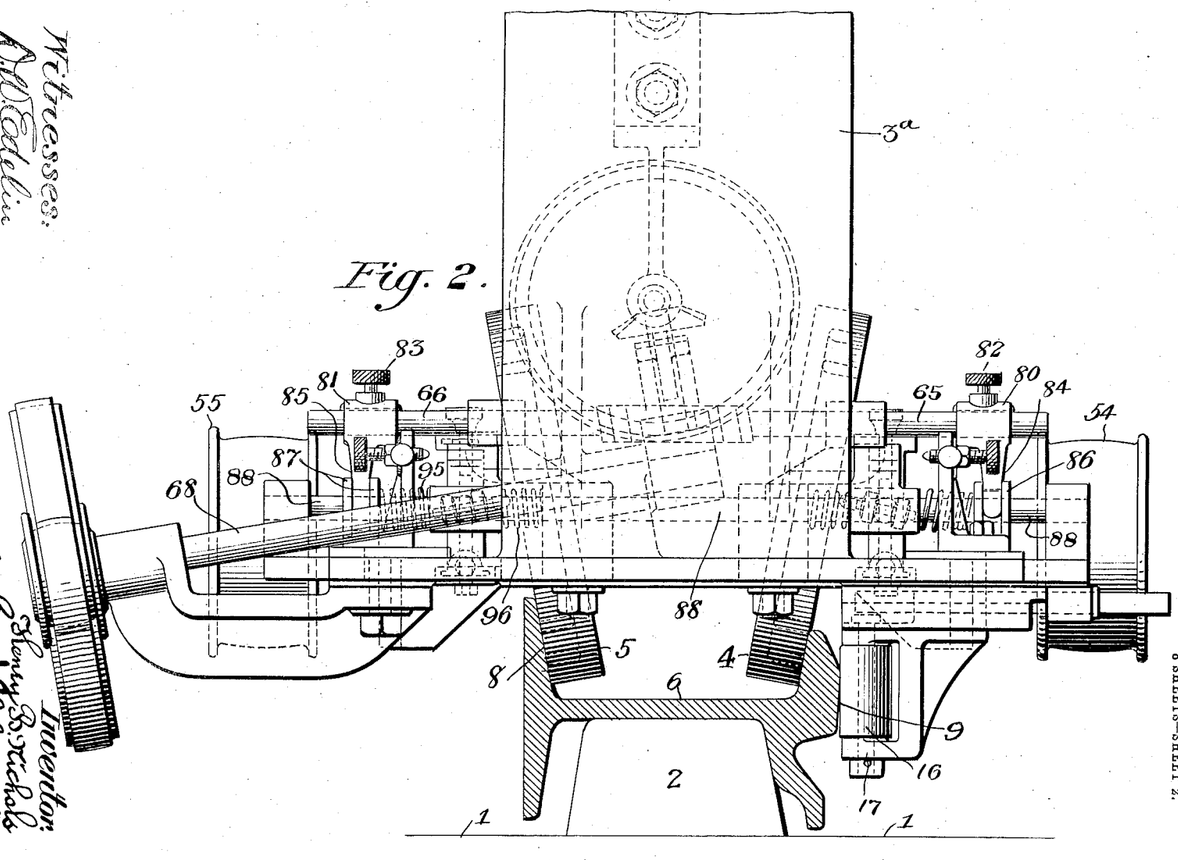
Fig. 2 is an opposite end view, with parts removed.
Figure 3:
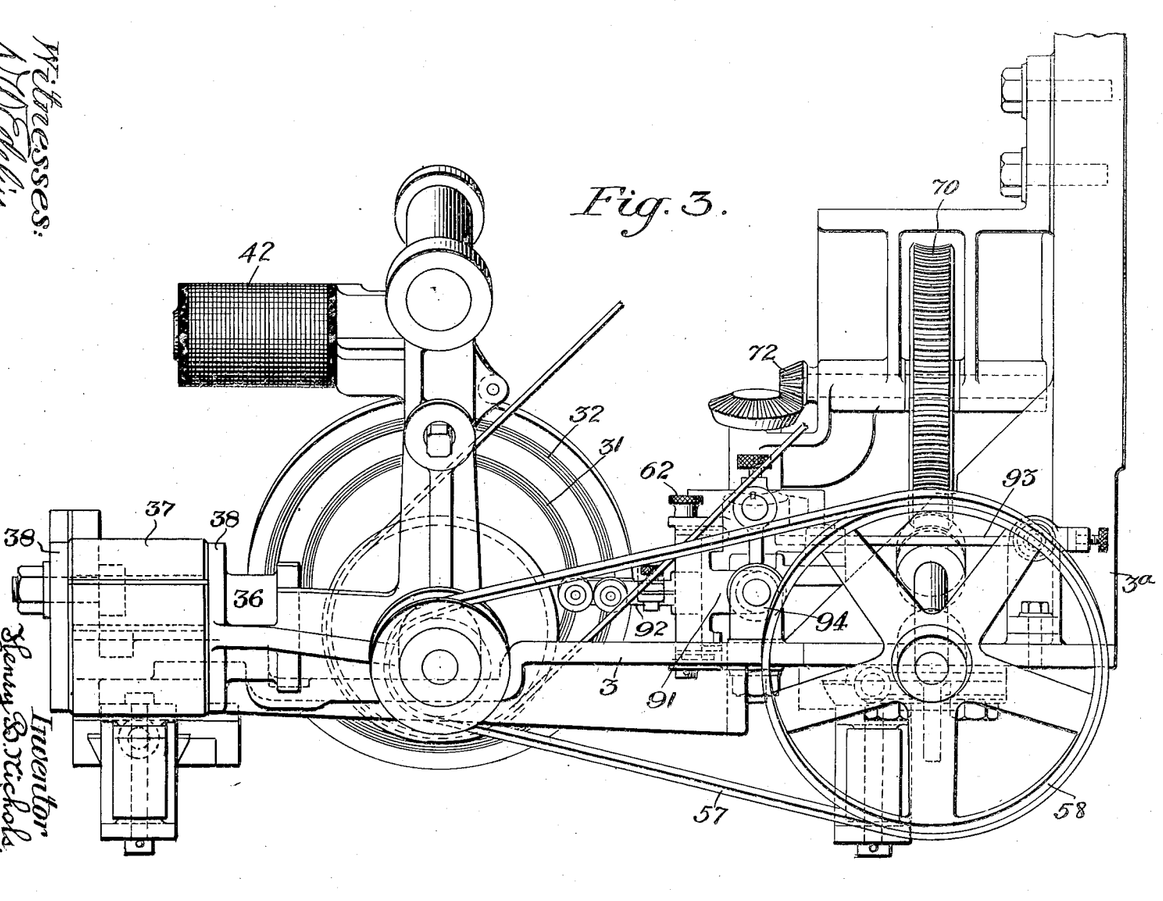
Fig. 3 is a side view looking in the direction of the arrow in Fig. 1.
Figure 4:
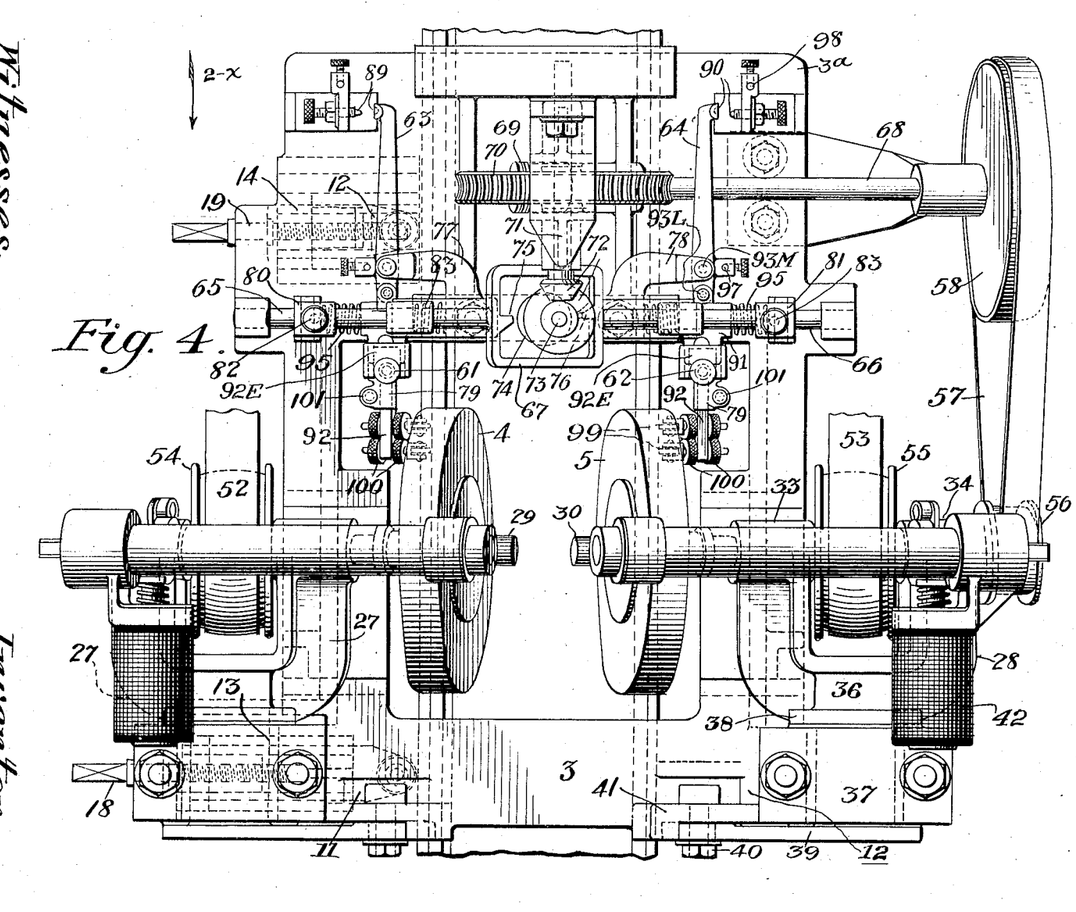
Fig. 4 is a plan view.

The angular setting of the spindle 68 is well illustrated in Fig. 2 which, as already stated, is a view looking in the direction of the arrow 2ˣ in Fig. 4.

The worm 69 drives the wheel 70, which turns a short stub shaft 71 journaled on the frame 3ª. This stub shaft in turn communicates motion through miter gears 72 to an upstanding shaft 73 carrying a cam 74 which as it rotates impinges on one and then the other of the cam projections 75, 76 formed on opposite sides of the frame 67, thus throwing the frame alternately in opposite directions and carrying with it the slide bars 65—66. On the ends of these bars are collars 80 and 81; secured by set screws 82 and 83 and provided with depending fingers 84—85 (see Fig. 2), the lower ends of which engage between flanges on the collars 86 and 87 fitted to slide upon the fixed bar 88, mounted below and parallel to the double bar 65 and 66. Thus, as the upper bar is reciprocated by the double or actuating cams, the collars move with it, and in so moving them advance their associated calipers one at a time into engagement with the surface of the wheel, and if the latter is worn so that the line of cut is below normal, the particular caliper in contact will become advanced far enough for the tail of its lever 63 or 64 to close contact at 89 or 90 as the case may be and thereby to affect the feed mechanism of the worm wheel.

Figure 8:
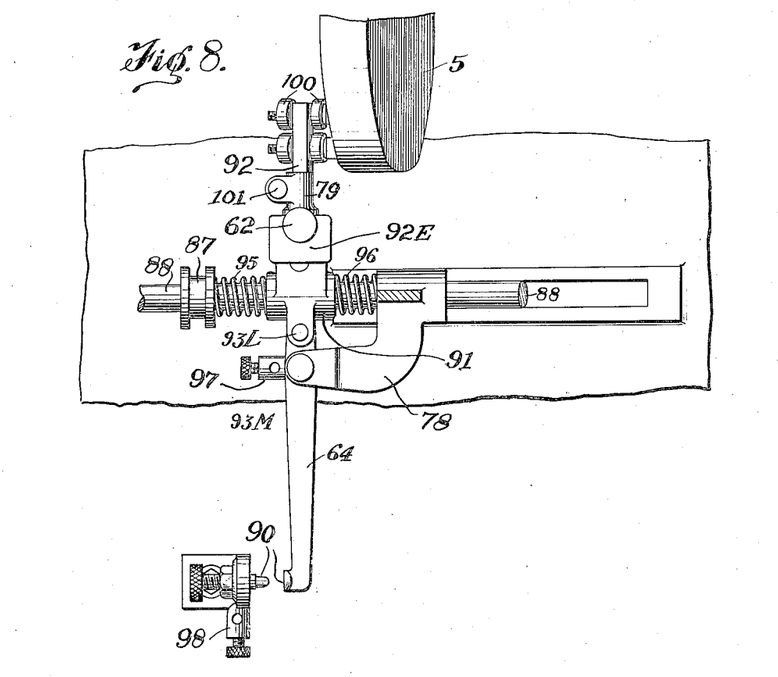
Figs. 8 and 9 are detail figures showing a caliper with other parts removed.
Figure 9:
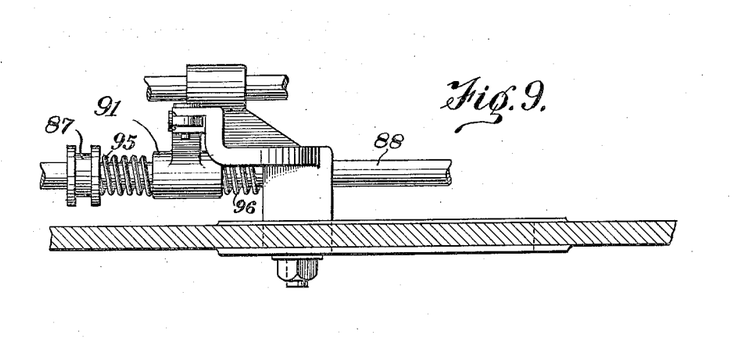

The structure and detailed arrangement of the caliper levers is best shown in Figs. 8 and 9, which are detail views with the other parts removed. Each lever is in three parts, the body 91, the forwardly extending arm 92 and the rearwardly extending contact arm 64. The body is in the form of a sleeve sliding upon bar 88, and engaged by two coiled springs 95 and 96, the former resting against the collar 87 and the latter against an extension of the frame carrying the bearing for the shafts. These springs are normally adjusted so that the body or sleeve will remain in an intermediate position with their caliper or feeler out of contact with the wheel, as shown in Fig. 4. The lever 64 is pivoted at 93ᴹ upon a rigid bracket projecting from the bearing portion of the frame. This pivot point is so located as to leave a long contact arm, and a relatively short actuating arm, connection of the latter with the body being effected by means of a pivot 93ᴸ. Thus, as the body reciprocates on the bar 88, the lever 64 is turned upon the pivot 93ᴹ. The arm 92 carries "feelers" shown in the form of steel rollers 99, adapted to touch the graphited rings in the face of their wheel when the caliper is actuated. These are carried upon a holder, rotatably adjustable in a socket piece 79, and locked when adjusted by means of a set-screw 101. This socket piece has a vertical adjustment in the holder or yoke 92ᴱ, this being regulated by the screws 61 or 62. The springs 95 and 96 are of such relative strengths, that 96 normally overcomes 95 and forces the body 91 to the left in Figs. 8 and 9. When the collar 86 or 87 is moved however, it compresses its associated spring 95 putting sufficient tension thereon to overcome the spring 96, thereby pushing the body 91 along the bar 88, carrying the feelers or rollers 99 into contact with their wheel, and at the same time turning the lever 93 on its pivot 93ᴹ. It will be observed that while the movement is positive, the connections are all resilient, so that no fine adjustments are required in these connections between the cam frame, the sliding bars and the calipers. The rollers 99 are held when adjusted upon the arm 92 by means of locknuts 100, and of course the rotation of this holder in its sleeve together with the vertical adjustment of the sleeve or socket permits the adaptation of the rollers to any position of the wheel 4 or 5. Electrical connection is effected with each caliper lever by means of a binding post 97, and the terminal contacts 89 and 90 are associated with insulated fixed terminals 98. These terminals 97 and 98 are connected in a circuit which includes a suitable source of current and the windings of the solenoid 42. Upon the closure of the contacts by either caliper, its solenoid will become energized, and will thereupon advance its wheel in the manner hereinbefore described.

It will be noted that the stub shaft 73 is not exactly vertical but is perpendicular to the spindle 68. It will appear from Fig. 2 that the cam surfaces are correspondingly inclined, bringing the points of impact of the cam 74 on the teeth 75 and 76 to the upper part of one and the lower part of the other, the frame 67 being broad enough to permit this.

It is thought the operation of the machine will be sufficiently apparent from the description without any detailed statement thereof. As a brief recapitulation however, it may be stated that when a rail is to be ground, the machine is first set up with all the parts adjusted substantially as shown in the accompanying drawings. The rail is then introduced, and the main feed mechanism with its stops set so as to produce the length of cut desired. The wheels 4 and 5 being rotated through to driving pulleys, produce cuts of the predetermined drop, and at the predetermined angles in the head and foot flanges. The calipers are periodically brought into action in the manner heretofore pointed out, and as long as the wheel surfaces are not worn to a greater extent than the maximum variation permitted and predetermined in the work, the feed is not affected. As soon as the wheel surfaces wear however, to an amount exceeding the predetermined limit, each caliper will close its contacts 89 or 90, energizing its respective solenoid, and step around its feed screw 21 or 22 so as to move the wheel and its sleeve or bushing upon the spindle and compensate for the wear. In this manner, and by properly constructing and adjusting the calipers, the cut on a rail or any other surface produced in this machine can be kept within a percentage variation so small as to be practically negligible.

When the machine is to be used for other work than railway rails, the support 2, the guides or stops, and other parts, will be altered or adjusted accordingly. The wheels 4 and 5 may be reversed in their action so as to grind on their inner instead of their outer faces; and thus it is possible to pass an object between the two wheels, and grind both its outside faces simultaneously, each at a different angle if so desired. In addition to thus varying the uses of this specific machine, the wheel parts and driving mechanism may be changed, remodeled or redesigned for any desired class of work, and this without departing from my invention if the main principle is still employed, which is to maintain a constant cut by causing the cutting surface to affect mechanism which will automatically and continuously compensate for wear. Obviously, this principle may be embodied in machines employing edge cutting instead of face cutting wheels, or in metal working machines employing steel cutting tools instead of abrasives. All such variations are contemplated by me, and are to be considered as well within the scope of the appended claims.

Having thus described my invention what I claim and desire to secure by Letters Patent is—

1. A metal surfacing machine comprising a work support, a tool support, means for producing relative feed between the work and the tool, means for maintaining adjustment of the tool with respect to the work, and means for determining such adjustment consisting of a calipering device engaging the tool and not the work, during the cut.

2. A metal working machine comprising a work support, a tool support and tool, means for producing relative feed between the work and the tool and means for automatically producing relative adjustment between the tool and work, as determined by and proportionate to the wear on the tool, during the cut.

3. In a metal working machine, a work support, a tool support and tool, means for producing relative feed between the work and the tool and means for producing a uniform and unvarying cut on the work, comprising a calipering device fixed with respect to the work and engaging the tool, together with a relative adjustment between the tool and work controlled by said calipering device, during the cut.

4. A grinding machine comprising a bed, a work support thereon adapted for sliding feed of the work, a superposed frame carrying a guide for the work, and adjustable grinding means mounted on said frame.

5. A grinding machine comprising a bed, a work support thereon, a superposed frame, guide rolls carried on said frame to maintain the work in proper alinement, a bracket pivotally mounted on the frame for angular adjustment of the cutting surface, journal bearings on said bracket, a spindle journaled therein, a grinding head mounted on said shaft, and means for locking the bracket to the frame when angularly adjusted.

6. A grinding machine comprising a bed, a work support thereon, a superposed frame supported above the bed and work support, a pair of guide rolls carried upon the lower side of said frame and extending into proximity to the work support so as to engage and guide the work, means for producing relative feed between the work and the frame, and grinding means mounted on the frame.

7. A grinding machine comprising a bed, a work support thereon, a superposed frame supported above the bed and work support, a pair of guide rolls carried upon the lower side of said frame and extending into proximity to the work support so as to engage and guide the work, means for producing relative feed between the work and the frame, and grinding means on the frame, together with means for adjusting said grinding means with respect to the guide rolls.

8. A grinding machine comprising a bed, a work support thereon, a superposed frame supported above the bed and work support, a pair of adjustable guide rolls carried upon the lower side of said frame and extending into proximity to the work support so as to engage and guide the work, means for producing relative feed between the work and the frame, and grinding means mounted on the frame, together with means for adjusting said grinding means with respect to the guide rolls.

9. A grinding machine comprising a bed, a work support thereon, a superposed frame supported above the bed and work support, a pair of guide rolls carried upon the lower side of said frame and extending into proximity to the work support so as to engage and guide the work, means for producing relative feed between the work and the frame, and grinding means mounted on the frame, together with means for changing the angle of the grinding means with respect to the work.

10. A grinding machine comprising a bed, a work support thereon, a superposed frame supported above the bed and work support, a pair of guide rolls carried upon the lower side of said frame and extending into proximity to the work support so as to engage and guide the work, means for producing relative feed between the work and the frame, and grinding means mounted on the frame, together with means for laterally feeding and for changing the angle of the grinding means with respect to the work.

11. A grinding machine comprising a bed, a work support thereon, a superposed frame supported above the bed and work support, a pair of guide rolls carried upon the lower side of said frame and extending into proximity to the work support so as to engage and guide the work, means for producing relative feed between the work and the frame, and grinding means mounted on the frame, together with automatic means controlled by variations in the grinding means for adjusting the same with respect to the work.

12. A grinding machine comprising a bed, a work support thereon, a superposed frame supported above the bed and work support, a pair of guide rolls carried upon the lower side of said frame and extending into proximity to the work support so as to engage and guide the work, means for producing relative feed between the work and the frame, and grinding means mounted on the frame, together with an automatic caliper engaging the grinding means, and mechanism responsive thereto for feeding the said grinding means.

13. A grinding machine comprising a bed, a work support thereon, a superposed frame supported above the bed and work support, a pair of guide rolls carried upon the lower side of said frame and extending into proximity to the work support so as to engage and guide the work, means for producing relative feed between the work and the frame, and grinding means mounted on the frame, together with an automatic caliper engaging the grinding means, and electromagnetic means controlled thereby for adjusting the grinding means with respect to the work.

14. A grinding machine comprising the following instrumentalities: a work support, a tool support, mechanism for producing relative longitudinal feed thereof and mechanism carried on the tool support operative during the cut to produce relative lateral feed to compensate continuously for wear on the tool.

15. A grinding machine comprising the following instrumentalities: a work support, a tool support, mechanism for producing relative longitudinal feed thereof, and independent mechanism operative during the cut to produce relative lateral feed to compensate continuously for wear on the tool.

16. A grinding machine comprising the following instrumentalities: a work support, a tool support, mechanism for producing relative longitudinal feed thereof, a transverse spindle mounted on the tool support, a grinding wheel on said spindle, and mechanism operative during each cut to produce compensating lateral feed of said spindle and grinding wheel with respect to the work.

17. A grinding machine comprising the following instrumentalities: a work support, a tool support, mechanism for producing relative longitudinal feed thereof, a transverse driven spindle mounted on the tool support, a grinding wheel on said spindle, and mechanism controlled in the surface wear of said grinding wheel for producing lateral feed of its spindle with respect to the work, and thereby compensating for said wear.

18. A grinding machine comprising the following instrumentalities: a work support, a tool support, mechanism for producing relative longitudinal feed thereof, a transverse spindle mounted on the tool support, a grinding wheel on said spindle, and mechanism acting continuously during each cut for maintaining the cutting surface of the grinding wheel constantly on the desired line of cut in the work, irrespective of wear.

19. A grinding machine comprising the following instrumentalities: a work support, a tool support, mechanism for producing relative longitudinal feed thereof, a transverse spindle mounted on the tool support, a grinding wheel thereon, and automatic mechanism acting during the progress of each cut to maintain the line of cut of the wheel and the desired line of cut in the work in constant coincidence.

20. A grinding machine comprising the following instrumentalities: a work support, a tool support, mechanism for producing relative longitudinal feed thereof, a driven spindle transversely mounted on the tool support, a grinding wheel thereon, and an automatic caliper bearing on the cutting surface of said grinding wheel, with transverse feed mechanism for the spindle controlled by said caliper.

21. A grinding machine comprising the following instrumentalities: a work support, a tool support, mechanism for producing relative longitudinal feed thereof, a pair of oppositely disposed driven spindles mounted on the tool support, a grinding wheel on each spindle, and mechanism acting during each cut to produce compensating lateral feed of the grinding wheels with respect to the work, and to each other.

22. A grinding machine comprising the following instrumentalities: a work support, a tool support, mechanism for producing relative longitudinal feed thereof, a pair of oppositely disposed driven spindles mounted on the tool support, a grinding wheel on each spindle, and mechanism controlled in the wear of the grinding wheels for producing lateral feed thereof with respect to the work.

23. A grinding machine comprising the following instrumentalities: a work support, a tool support, mechanism for producing relative longitudinal feed thereof, a pair of oppositely disposed driven spindles mounted on the tool support, a grinding wheel on each spindle, and mechanism for maintaining the cutting surfaces of the grinding wheels in a constant position with respect to the work and to each other.

24. A grinding machine comprising the following instrumentalities: a work support, a tool support, mechanism for producing relative longitudinal feed thereof, a pair of oppositely disposed driven spindles mounted on the tool support, a grinding wheel on each spindle, and automatic mechanism adapted to maintain the lines of cut of the grinding wheels constant.

25. A grinding machine comprising the following instrumentalities: a work support, a tool support, mechanism for producing relative longitudinal feed thereof, a pair of oppositely disposed driven spindles mounted on the tool support, a grinding wheel on each spindle, and a pair of automatic calipers in contact with the cutting surfaces of the grinding wheels with feed mechanism therefor controlled by said calipers.

26. A grinding machine comprising the following instrumentalities: a work support, a tool support, a grinding wheel mounted on the tool support, means for driving the same, and means controlled from the surface of the wheel acting during the cut to compensate for wear thereof.

27. A grinding machine comprising the following instrumentalities: a work support, a tool support, a grinding wheel journaled on the tool support, mechanism for adjusting said wheel to compensate for wear thereof, and an automatic caliper bearing on the surface of said wheel during the cut and controlling said mechanism.

28. A grinding machine comprising the following instrumentalities: a work support, a tool support, a grinding wheel journaled on the tool support, said wheel having a portion of its working surface composed of antifriction material and the rest of the surface of abrasive material, and automatic calipering mechanism engaging said antifriction material, together with feed mechanism for the wheel controlled by said calipering mechanism.

29. A machine for grinding railway rails comprising the following instrumentalities: a horizontal bed having a longitudinal screw feed and carrying a rail support, a transverse bridge over the bed having a horizontal frame attached thereto, a U-shaped bracket with a stem locked in bearings on the frame with its axis parallel to the main feed, a spindle journaled in said bracket with its axis at right angles to the axis of the bracket stem and bearing, a grinding wheel on the end of said spindle, and a driving pulley on the same intermediate the arms of the bracket.

30. A machine for grinding railway rails comprising the following instrumentalities: a horizontal bed plate having a longitudinal feed and carrying a rail support on its upper surface, adapted to receive and hold a railway rail upon its side, with its head and foot flanges upstanding, a transverse bridge across the bed carrying a horizontal frame overlying the rail support, a guide on the under side of said frame engaging the top or rolling surface of the head of the rail, and a grinding wheel journaled on said frame and having its cutting surface adjusted relatively to said guide, so as to maintain constant the thickness of the rail head.

31. A grinding machine for railway rails comprising the following instrumentalities: a horizontal bed plate having a longitudinal feed and carrying a rail support on its upper surface, adapted to receive and hold a railway rail upon its side, with its head and foot flanges upstanding, a transverse bridge across the bed carrying a horizontal frame overlying the rail support, a guide on the under side of said frame engaging the top or rolling surface of the head of the rail, and a grinding wheel journaled at an angle on said frame, with means for adjusting its cutting surface both as to angle and line feed, with respect to said guide, whereby the thickness and also the face angle of the rail head may be maintained constant.

32. A grinding machine for railway rails comprising the following instrumentalities: a fixed rail support, a guide adapted to bear on the head of the rail, and a grinding wheel on a driven spindle transverse to the length of the rail, with means to maintain the cutting surface of the wheel in a constant relation to said guide.

33. A machine for grinding railway rails comprising the following instrumentalities: a rail support, a guide adapted to engage the rail, a pair of grinding wheels carried on driven spindles journaled transversely to the length of the rail, said wheels adapted to engage the inside faces of the head and foot flanges of the rail, and means for maintaining a constant and fixed relation between the cutting faces of the two wheels and the guide.

34. In a machine for grinding railway rails, a rail support, a wheel frame, a spindle journaled on said frame, a grinding wheel on said spindle, and feed mechanism therefor comprising a screw shaft parallel to the spindle, a threaded traveler thereon having an arm engaging the spindle, a ratchet wheel on the screw shaft, a pawl engaging the same, and electromagnetic means for actuating said pawl and thereby turning the shaft.

35. In a machine for grinding railway rails, a rail support, a wheel frame, a spindle journaled on said frame, a grinding wheel on said spindle, and feed mechanism therefor comprising a screw shaft parallel to the spindle, a threaded traveler thereon having an arm engaging the spindle, a ratchet wheel on the screw shaft, a pawl engaging the same, and electromagnetic means for actuating said pawl and thereby turning the shaft, said electromagnetic means being controlled through intermediate electrical circuits by the wear on the grinding wheel, and acting to compensate so as to maintain the same always constant.

36. In an automatic grinding machine, a work support, a grinding wheel having a feed motion to compensate for wear, feed mechanism for the wheel, and an automatic calipering device comprising a sliding body carrying a feeler adapted to engage the wheel during the cut and a pivoted lever adapted to be swung by said body in its movement.

In testimony whereof I affix my signature in presence of two witnesses.

HENRY B. NICHOLS.

Witnesses:
BENJ. STOTT,
LANSFORD E. KNAPP.